Nov. 16, 1971   K. D. WOOD   3,619,997
SEPARATOR MEANS FOR COMBINES
Filed March 4, 1970   3 Sheets-Sheet 1
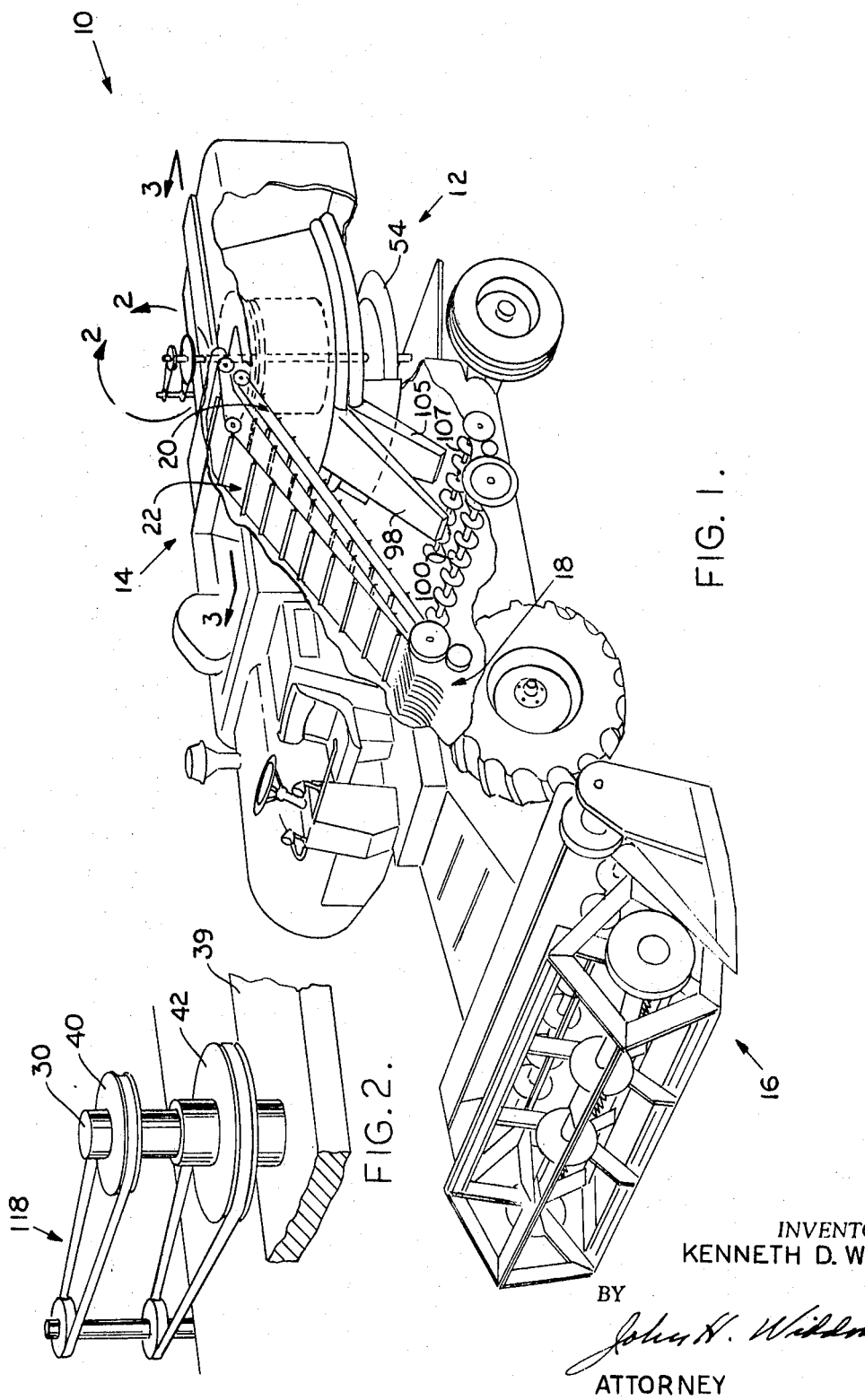
INVENTOR.
KENNETH D. WOOD
BY
*John H. Wilkinson*
ATTORNEY

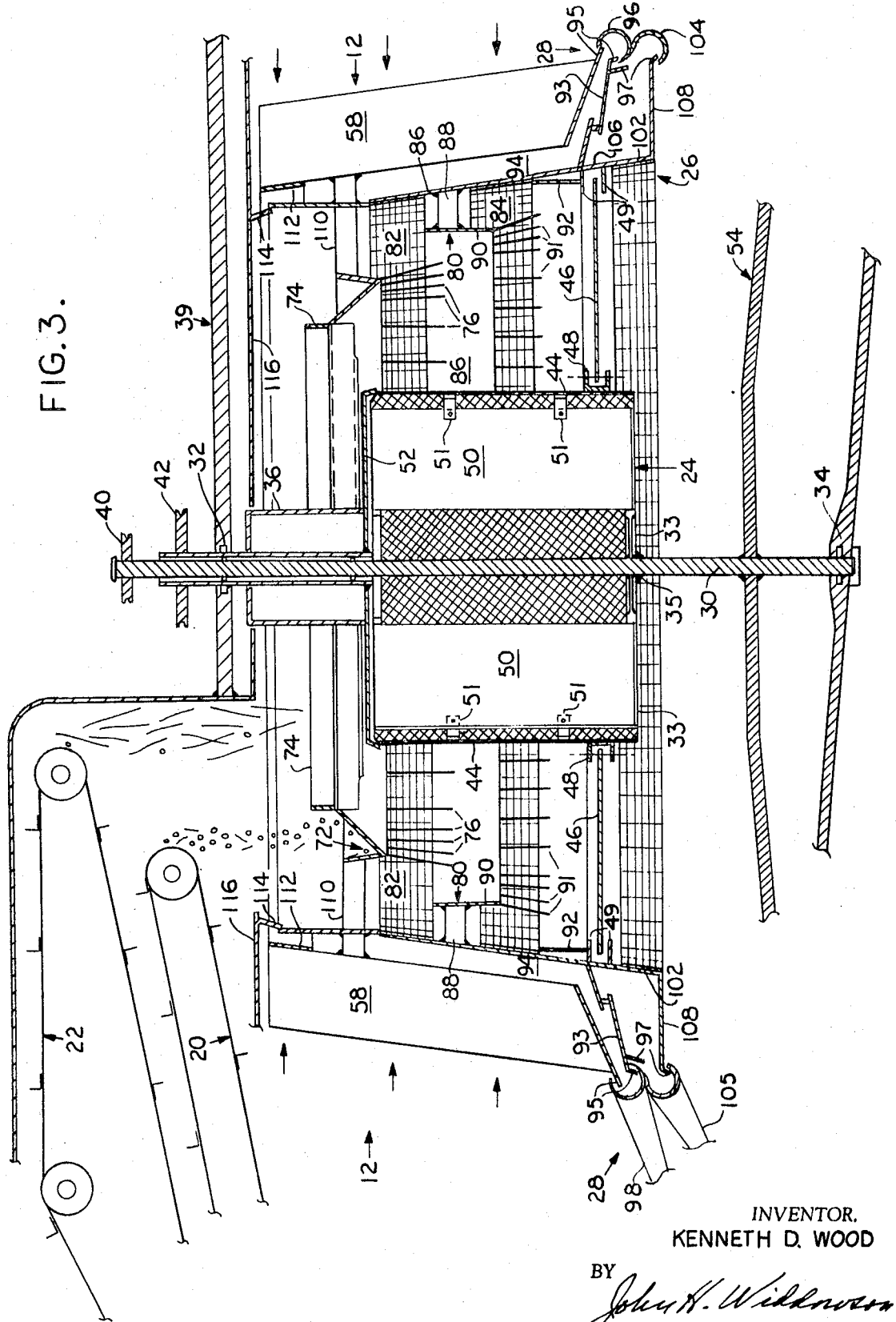

United States Patent Office 3,619,997
Patented Nov. 16, 1971

3,619,997
SEPARATOR MEANS FOR COMBINES
Kenneth D. Wood, 1826 Greenfield,
Wichita, Kans. 67217
Filed Mar. 4, 1970, Ser. No. 16,464
Int. Cl. A01d 41/12
U.S. Cl. 56—14.6          8 Claims

ABSTRACT OF THE DISCLOSURE

This invention is a separator means for combines which have a reel and header assembly, thresher cylinder, conveying means for moving threshed cereal grass, powering means, and a housing comprising the structure thereof. The separator means is comprised of an independently rotatable outer cylinder member mounted within and powered by the combine. In operation the outer cylinder rotates about its longitudinal axis and receives threshed material from the conveyor, disposes same through a distribution means to a grain-stalk separator, and draws air radially inward against the motion of the grain, separating same from its stalk. The separated grain passes to a grain collector. Air is drawn through the wall of the cylinder member and is discharged downward with the separated stalk segments. The separator uses rotation and centrifugal force and opposed airflow to separate threshed cereal grass stalk and grain.

---

Numerous devices are known to the prior art for separating the grain and stalk of harvested cereal grass. These devices utilize the mass difference in the grain and its stalk to separate them by means of either centrifugal force or airflow or size difference of the particles. These devices normally utilize only two of the means for separation of the grain and straw. The prior art devices also depend upon the orientation of the device for its efficient operation thus do not function efficiently when tilted to any substantial degree. Also, the prior art devices are of a generally complicated mechanical nature and have many intricately formed moving parts thus are difficult to construct and maintain.

One preferred specific embodiment of the separator means for combines of this invention includes two coaxial rotatable cylinder members, one substantially inside the other. The separator means herein described is understood to receive grain, spikes of grain and some material with bits of the stalk attached from the thresher cylinder of the combine. The inner cylinder member receives air through its porous sidewall and directs same downward to the straw discharge of the combine. The trough mounted with the outer cylinder member receives mostly grain from the thresher cylinder of the combine and further separates the straw from the grain. The outer cylinder member has on its outer circumferential portion a plurality of louvers shaped to direct air radially inward toward the axis of the cylinder members. The outer cylinder member preferably has the general shape of a frustum of a cone with the louvers on its outer portion which are covered by a screen like surface, on its upper portion having a V-shaped trough positioned somewhat above a grain-stalk separator which separates the material directing the straw downward between the cylinder members. The material passing between the cylinder members is chopped by blades attached to the inner cylinder member, and discharged from the separator on the bottom of the cylinder members. The grain is forced outward against the air flow and contacts the louvers, sliding to the lower peripheral portion of the outer cylinder member. A grain collecting passageway surrounds the lower peripheral portion of the outer cylinder member. It collects the grain and directs it to the grain storage area of the combine. The separator means of this invention is positioned where the separator of a conventional combine is normally positioned, and the two cylinder members are rotated from the driving mechanism of the combine and preferably at different speeds which can be varied.

One object of the separator means for combines of this invention is to overcome the aforementioned disadvantages of the prior art devices.

Another object of this invention is to provide a new, novel, simple and efficient means of separating a threshed cereal grass or similar material.

Another object of this invention is to provide a separator means for combines which functions efficiently without the specific interference from any tilt the combine may encounter while operating in rough terrain.

Another object of this invention is to provide a separator means which can be adapted to the existing popular styles of combines without major redesigning.

Various other objects, advantages, and features of the invention will become apparent to those skilled in the art from the following discussion, taken in conjunction with the accompanying drawings, in which:

FIG. 1 is a frontal perspective view of a conventional combine of a typical and popular design with the separator means of this invention operably installed and having portions of the combine removed for clarity;

FIG. 2 is a perspective view of the driving means of the separator means of this invention as seen on top of the combine structure as taken along segment 2—2 of FIG. 1;

FIG. 3 is a cross-sectional view of the combine and separator means of this invention taken on line 3—3 of FIG. 1.

Figure 4:
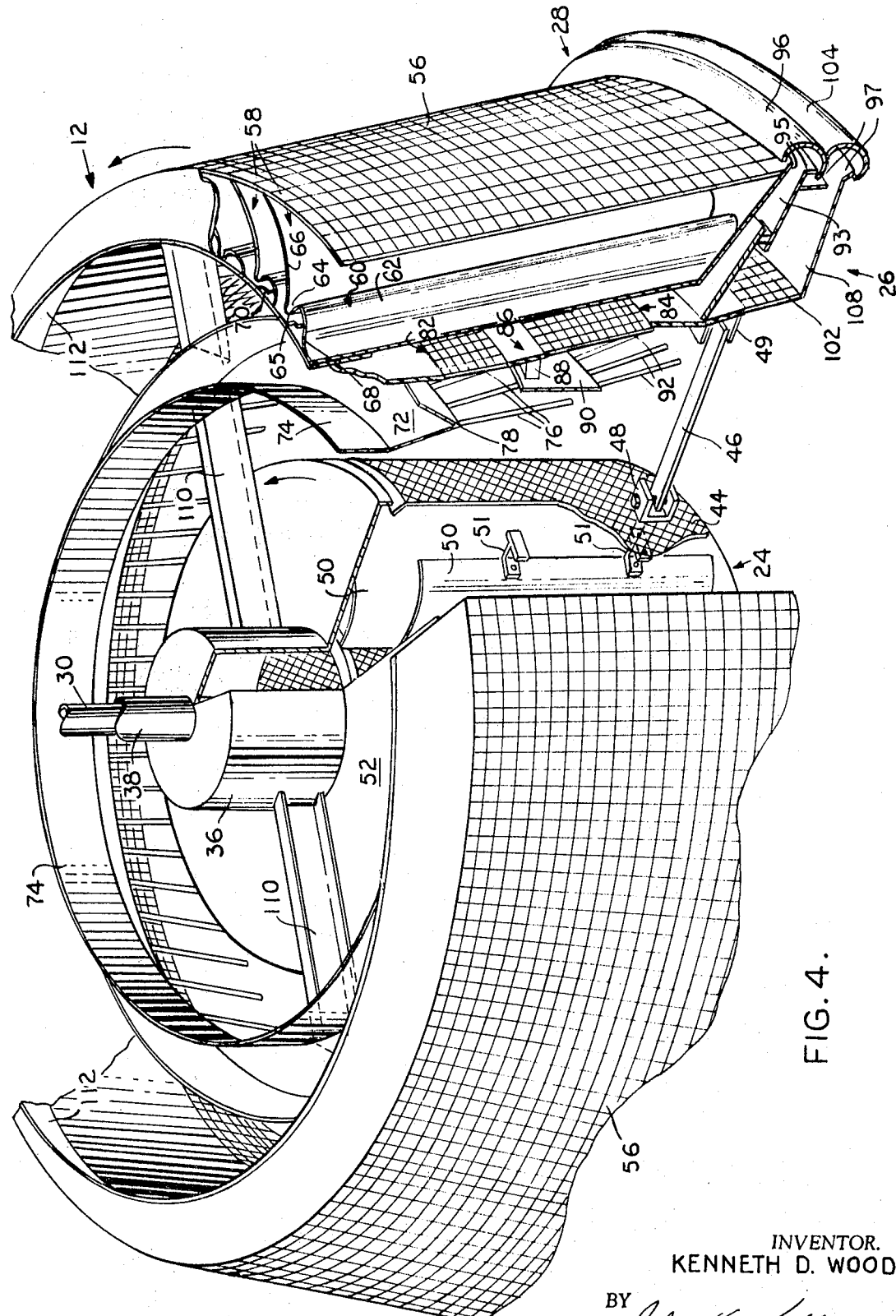
FIG. 4 is a perspective view of the separator means of this invention with a section removed exposing the internal parts thereof.

The following is a discussion and description of preferred specific embodiments of the separator means for combines of this invention, such being made with reference to the drawings whereupon the same reference numerals are used to indicate the same or similar parts and/or structure. It is to be understood that such discussion and description is not to unduly limit the scope of the invention.

Referring to the drawings in detail and in particular to FIG. 1, a conventional combine of a typical and popular design is shown, generally indicated at 10, and having the separator of this invention 12 operably installed. In operation material is cut by the header assembly 16, separated from the stalk or stem thereof by the thresher cylinder 18 and fed by a conveyor system 14 to the separator 12.

The separator 12 is positioned in the normally rear portion of the combine 10 with its axis vertically disposed. The conveyor system 14 includes two conveyors to transport the partially separated cereal grass from the threshing cylinder 18 to the separator 12. One of the conveyors 20 carries mostly grain, grain spikes and some stalk and the other conveyor 22 carries mostly stalk and some grain.

The separator 12 includes an inner cylinder member 24 and an outer cylinder member 26 and a grain collector passageway 28. Both cylinder members are coaxial with a shaft 30 attached to the inner cylinder member 24 and rotatably attached to the combine structure at 32 and 34, above and below the separator 12. The inner cylinder member 24 is attached to the shaft 30 at 35, on its preferably perforate bottom member 33 to rotate therewith and the outer cylinder member 26 is attached to and supported by a sleeve member 36 a portion of which 38 surrounds the shaft 30 and extends from the structure 39 of the combine 10. Both the shaft 30 and the sleeve 38 are fitted with pulleys 40 and 42 respectively, to operably connect the separator 12 with the powering means of the combine 10. The inner cylinder member 24 of the separator 12 has an outer wall 44 generally cylindrical in shape substantially comprising its outer surface and having perforations therein, shown in the drawings as a screen-like member and having the bottom member 33 joined to rotate therewith. On the lower outer portion of the outer wall 44 a plurality of elongated rectangular chopper blades 46 are attached by fittings 48. The chopper blades 46 extend to near the outer cylinder member 26 into a slot member 49 on the outer cylindrical member 26 and serve to chop and further thresh the material which is separated by the outer cylinder member 26. The inside of the inner cylinder member 24 contains a plurality of vanes 50 attached to the inner cylinder wall member 44 of the inner cylinder member 24. The covering structure 52 is supported on the sleeve member 36 and covers the inner cylinder member. Material mostly grain with bits of stalk attached is carried by the conveyor 22, falls on the platform member 52 and is spun off by its rotational motion applying centrifugal force to material. The forced material after leaving the platform member 52 falls into the space between the cylindrical members 24 and 26. The vanes 50 are generally vertical and partially circular in planform positioned somewhat radially in a circular area about the shaft 30. The vanes 50 are attached to the bottom perforate member 33 and by braces 51 to the wall 44 to draw air radially inward passing through the wall 44 downward through the bottom 33 of the inner cylinder member 24. The stalk material is dispersed from the combine 10 to the field by the straw spreader 54 which is attached to the shaft 30 to rotate therewith.

The outer cylinder member 26 is substantially surrounded circumferentially by a screen 56. The outer portion of the outer cylinder member 26 has a plurality of louvers 58 which are shaped to collect air and direct it radially inward. Also, it prevents the grain from escaping the outer cylinder member 26 and directs it downward toward the grain collecting passageways 28. The louvers 58 are formed with a trough 60 in the inner portion thereof having the closed portion 62 disposed radially outward and one side 64 formed to a peak 65 with the larger portion 66 of the louver which is disposed radially outward and having the other side 68 extending radially inward, around the peak 65 of the adjacent louver and having a tip portion 70 partially into its trough 60. The inner portion of the outer cylinder member 26 has an upwardly open V-shaped trough 72 which receives mostly grain and grain spikes from the conveyor 20. The trough 72 has a nearly vertical upwardly extending flange 74 from the inside wall and a plurality of prongs 76 extending generally downward from its bottom portion 78. Attached to the inwardly disposed surface of the louvers 58 is an additional separator member 80 having two cylindrical screen sections 82 and 84 joined by a support member 86. The support member 86 has an additional support member 88 attached to its surface which positions a cylindrical band 90 somewhat vertically and has a plurality of prongs 91 extending downward therefrom into the cavity between the cylinder members 24 and 26. Attached to the lower portion of the lower screen section 84 is an additional wall portion 92 of the inner wall of the outer cylinder member 26, which joins the slotted member 49. The inner wall of the outer cylinder member 26 is formed by the wall 92 and the separator member 80; a cavity 94 is formed between the inner wall, the louvers 58 and partition 93 for grain to pass. The cavity 94 is connected to the grain collector passageway 28 below the louvers 58. The grain collector passage 28 consists of two annular passageways around the lower peripheral edge of the outer cylinder member 26.

The grain collector passageway 28 remains stationary, and the outer cylinder member rotates with deflectors 95 and 97 extending therein. One passageway 96 joins the cavity 94, and has a discharge spout 98 which discharges the collected grain into an auger 100 which carries same to the storage area of the combine 10. Any grain not separated or threshed from its stalk by the above mentioned separators passes through the chopper blades 46 and is separated and threshed at that time. When material passes through the chopper blades 46, it is cut into smaller segments. The grain then moves radially outward due to the force imparted to it by the rotating chopper blades 46, and rotation of outer cylinder 26 and passes through a screen 102 and into a collector passageway 104; the other material, primarily straw or similar stalks, passes downward and is discharged from the combine 10. The collecting passageway 104 is similar to the grain collecting passageway 96 and has a spout 105 discharging grain to a return auger 107 which returns the collected material to the thresher cylinder 18 to be recycled for further separation. The screen 102 is generally cylindrical in shape and forms the lower inner portion of the outer cylinder member 26 by attaching to the band-like support member 106 which holds the slot member 49 and the bottom member 108 of the outer cylinder member 26. The bottom member 108 is generally circular in planform covering the bottom portion of the outer cylinder member 26 forming a cavity with the screen 102 and the partition 93 joining the grain collecting passageway 104. On its upper portion, the outer cylindrical member 26 is supported and rotated by support members 110 attached to the sleeve member 36 and the louvers 58 which are held by a cylindrical support member 112 on their inner surface. Grain is prevented from flowing over the top of the louvers 58 by a retainer member 114 attached to the upper inner structure 116 of the combine 10.

When in operation the cylinder members 24 and 26 rotate at different speeds, the inner cylinder member 24 preferably faster. They are driven from the mechanism of the combine by a drive shaft with pulleys attached shown generally at 118; also, the drive shaft 118 can preferably be rotated at different rotational speeds to provide for the most efficient separation of various types of cereal grass.

In the use and in operation of the separator means 12 of this invention, it is seen that same provides a means to separate threshed cereal grass or like material by use of two rotating coaxial cylinder like separator members 24 and 26. The outer cylinder separator member 26 separates the grain from the stalk, collects the separated grain and directs it to a passageway 28 so it may be placed in the storage area of the conventional combine 10. The inner cylinder member 24 passes air through its sidewall 44 and out its bottom member 33 to the straw spreader 54 of the combine aiding in dispersion of the straw and venting the air passing through the outer cylinder member 26. It is to be understood the separator means of this invention can be used to separate a number of different types of grains including the following: oats, barley, wheat, alfalfa, flax, bermuda grass, blue grass, maize, corn, soy beans and milo.

As will be apparent from the foregoing description of the applicant's separator means, a novel and efficient means has been provided to readily separate threshed cereal grass by using centrifugal force and opposing air flow which is adaptable to conventional combines of the currently popular design. The separator means is efficient in operation, without regard to the type of cereal grass combined or terrain of the fields, simple in design, relatively easily manufactured and adapted to existing combine designs.

While the invention has been described in conjunction with preferred specific embodiments thereof, it will be understood that this description is intended to illustrate and not limit the scope of the invention, which is defined by the following claims.

I claim:
1. In a combine having a reel and header assembly, a thresher cylinder, conveying means for threshed cereal grass therefrom, powering means, and housing means comprising the structure of said combine, therein and therewith the separator means of this invention comprising:
   (a) an outer hollow perforated member rotatably mounted about a substantially vertical axis in said combine structure and connected to said powering means to be in operation rotated by same,
   (b) said outer member being in communication with said conveyor means to receive therefrom in operation threshed cereal grass and said outer member having means to direct air radially inward through itself upon rotation,
   (c) means mounted relative said combine structure to in operation pass air inwardly through said outer member,
   (d) said outer member having a dispersing means therearound in the upper portion thereof and a stalk-grain separator means on the inner wall thereof, and said outer member in operation receiving substantially all the threshed grain from said conveyor means in said dispersing means and transferring same to said stalk-grain separator means,
   (e) grain collecting means around said outer member in the lower portion thereof, and
   (f) a plurality of stalk-grain separating members on said stalk-grain separator means which in operation separates grain from its stalk and directs free grain to said grain collecting means.

2. A separator means as described in claim 1, wherein:
   (a) said means mounted relative said combine structure to in operation pass air inward through said outer member is a hollow perforated member rotatably and co-axially mounted about said vertical axis within said outer member, and said inner member is connected to said powering means to be in operation independently rotated by same, and
   (b) said inner member has a substantially horizontal platform member overlaying said inner member, and in operation a portion of said threshed cereal grass from said conveyor means is received on said platform member for a dispersal to said stalk-grain separator means.

3. A separator means as described in claim 2, wherein:
   (a) said hollow members are cylinders and the inner cylinder member is rotatably attached to said combine housing by a normally vertically disposed shaft member along its longitudinal axis,
   (b) said shaft member extends from said inner cylinder member and rotatably attaches said combine housing below and above said separator means, and
   (c) said shaft is rotatably attached to said powering means which provides power therefor and has means to vary the rotational speed of said attached inner cylinder to vary the rotational speed of said attached inner cylinder member.

4. A separator means as described in claim 3, wherein:
   (a) said inner cylinder member has a substantially porous cylinder wall,
   (b) said cylinder wall has a plurality of elongated generally rectangular blades extending radially from the lower outer portion thereof and said blades substantially span the space between said inner cylinder member and said outer cylinder member,
   (c) said inner cylinder member is attached to said shaft member by a perforate support member attached to said cylinder wall on the lower portion thereof, and
   (d) said inner cylinder member contains a plurality of curved blades positioned in a circular area around the central portion thereof, said blades are generally semi-circular in planform and extend substantially the vertical length of said inner cylinder member being attached to said perforate support member and said sidewall, and in operation said curved blades force air received from said outer cylinder member through said sidewall is directed downward to be discharged from said separator means through said perforate support member.

5. A separator means as described in claim 2, wherein:
   (a) said outer member is a cylinder normally having its longitudinal axis vertically disposed is rotatably attached to said combine housing by a support member attachable to said powering means, and having means to vary the rotational speed of said outer cylinder member, and
   (b) said outer cylinder member has an outward shape substantially that of a frustum of a cone having the small diameter portion upward and having said means to direct air on the outer portion thereof and said stalk-grain separator on the inner portion thereof, and
   (c) said support member of said outer cylinder member supports said platform member by a hub member fitted around said shaft to rotate independently thereabout and a plurality of brace members extending radially therefrom to join and support said outer cylinder member.

6. A separator means as described in claim 5, wherein:
   (a) said support member of said outer cylinder member has said brace members extending from said hub member attaching said means to direct air positioned on the upper portions of said stalk-grain separator means, and said hub member has a sleeve member rotatably attached to said shaft and having its upper end extending from said combine housing and fitted with a pulley means, the central portion of said sleeve has said hub member therearound and of a diameter greater than that of said sleeve, said hub member being closed on the upper end thereof and attached to said platform member on the lower end thereof, the lower end portion of said sleeve member contains a bearing member between same and said shaft, said sleeve member attaches said platform member, and said platform member extends over the upper edge portion of said inner cylinder member, not in contact therewith,
   (b) said inner portion of said outer cylinder member having said stalk-grain separator means comprising a porous wall comprised of a plurality of screen portions and band portions alternating in a somewhat vertically disposed position the upper portion of which attaches said brace members for support thereof and has a blade end covering member somewhat U-shaped internally attached therearound on the lowermost band portion of said wall positioned to accept the ends of said blades extending from said inner cylinder member, a separator section supported from a center band portion of said wall, by a support member having a band-like segment supporting a plurality of prong members extending generally downward and radially outward vertically above said separator section, and radially inward is dispersing trough means supported from said brace members extending from said hub, having a somewhat V-shaped trough circular in planform with a plurality of prong members extending generally downward and radially outward from said trough and said dispersing trough means having its radially inward wall extending vertically above the level of said outward sidewall to a level above that of said brace members,
   (c) said means to direct air has louvers comprising substantially the outer portion of said outer cylinder member have on the inner exposed portion thereof means to be supported by said brace members emanating from said hub, and said louvers being uniformly spaced in a circular fashion around the axis of said cylindrical members have an individual curvilinear planform with a substantial segment partially circular having the axis thereof in the direction of rotation of said outer cylinder member which in operation directs air inward and a trough portion on the inner portion thereof opening inward which in operation catches free grain passing through said separator section, prevents same from passing through said louvers and directs same downward within a cavity between said separator section and said exposed inner portion of said louvers, said cavity extends around said exposed inner portion of said louvers, and radially below said louvers, and said cavity has flanges extending from the outer portion thereof, and the outer surface of said outer cylinder member has a screen-like covering over said louvers which in operation prevents foreign objects from entering said louvers, and (d) said screen separator has joining the outer surface of the lower segment thereof a cavity therearound and separated from said cavity between said louvers and said screen separator and passing said free grain from said lower segment of said screen separator.

7. A separator means as described in claim 1, wherein:
(a) said collecting means is supported by said combine housing around the lower peripheral portion of said outer member and has two inwardly opening annular chambers in communication with said outer member in operation to receive free grain therefrom, and said annular chambers having spouts therefrom to in operation pass free grain therefrom,
(b) said annular chambers having said opening therearound the inner portion thereof receiving an edge portion of flanges of said outer, lower peripheral portion of said outer member and in operation said cylinder member rotating with said flanges within said annular chambers.

8. A separator means as described in claims 1, 4, 6 and 7, wherein:
(a) said combine having a reel and header assembly and a housing comprising its structure having a powering means and control means, thresher cylinder and conveying means for conveying threshed cereal grass therefrom, temporary storage area and auger means thereto, straw spreader means and therein and therewith combining said separator means which in operation rotates both said inner cylinder member and said outer cylinder member about the longitudinal axis of same and draws air from surrounding atmosphere, passes same inward through said outer cylinder member by means of said louvers and through said stalk-grain separator passing same inward and downward through said inner cylinder member and discharging same from said combine above said straw spreader means and said separator receives grain, grain spikes and grain attached to stalk segments by said conveyor means, said grain spikes and said grain attached to stalk segments are received on said platform member and moves therefrom to said stalk-grain separator means, said grain and said grain spikes are received in said dispersing trough means and by rotationally caused forces thereof passes therefrom to said stalk-grain separator wherein same is separated from remaining stalk segments thereof by moving against said air and through said screen sections into said cavity and to said collecting means, said stalk segments separated from said grain pass downward in said space between said inner cylinder member and said outer cylinder member and passed said blades whereupon same is chopped and further separated from said grain and is received in another said cavity in the lower portion of said outer cylinder member and transmitted to a return auger collecting means moving same to said thresher cylinder and said stalk segments are discharged from said separator to said straw spreader means.

References Cited
UNITED STATES PATENTS

| | | | |
|---|---|---|---|
| 1,702,323 | 2/1929 | Stevens et al. | 56—14.6 X |
| 1,764,040 | 7/1930 | Edwards | 56—14.6 X |
| 3,394,808 | 7/1968 | Thompson | 209—291 |

LOUIS G. MANCENE, Primary Examiner

D. L. WEINHOLD, JR., Assistant Examiner

U.S. Cl. X.R.

209—291

UNITED STATES PATENT OFFICE
CERTIFICATE OF CORRECTION

Patent No. 3,619,997      Dated  November 16, 1971

Inventor(s) Kenneth D. Wood

It is certified that error appears in the above-identified patent and that said Letters Patent are hereby corrected as shown below:

Column 1, line 5, "Ser. No. 16,464" should read -- Ser. No. 16,465 --. Column 3, line 27, after "radially" insert -- and --. Column 5, lines 56 and 57, cancel "to vary the rotational speed of said attached inner cylinder".

Signed and sealed this 27th day of June 1972.

(SEAL)
Attest:

EDWARD M. FLETCHER, JR.
Attesting Officer

ROBERT GOTTSCHALK
Commissioner of Patents